Oct. 9, 1951  E. KLESSIG  2,570,351

FLOW REGULATING VALVE

Filed June 18, 1945

INVENTOR.
ERNST KLESSIG

BY Ralph L. Tweedale
ATTORNEY

Patented Oct. 9, 1951

2,570,351

UNITED STATES PATENT OFFICE 2,570,351

FLOW REGULATING VALVE

Ernst Klessig, Berkley, Mich., assignor to Vickers Incorporated, Detroit, Mich., a corporation of Michigan Application June 18, 1945, Serial No. 600,006

8 Claims. (Cl. 60—52)

This invention relates to power transmissions, particularly to those of the type comprising two or more fluid pressure energy translating devices, one of which may function as a pump and another as a fluid motor.

In particular, the invention relates to an improvement in a flow-regulating valve comprising an adjustable throttle and a compensating valve for maintaining a constant flow across the throttle through which fluid is adapted to flow at a regulated rate regardless of load resistance.

Flow-regulating valves have an important use in hydraulic power transmissions for driving machine tools. They serve the purpose of producing a reduced speed rate of the machine tool, and the machine tool may be driven at a constant regulated rate of speed regardless of load resistance.

In the past some difficulty was presented in preventing motor jump when the motor was started after interruption and in particular when a machine tool slide was moved into a feed position from rest or where there was a resumption of a feed movement after interruption during a slide movement. In many cases, if a feed movement was interrupted and the operator of the slide machine tool did not back the tool away from the work before resuming a cut, the tool was ruined. This is due to the fact that, when flow through the flow-regulating valve is interrupted, the compensating valve is held to the fully open position by a compensating valve spring. When flow is resumed after interruption, a temporary flow of fluid above the normal regulated rate passes through the fully open compensating valve before it is able to assume normal regulating position. Although this is only a momentary lapse and the compensating valve almost immediately assumes normal regulating position, this temporary flow of fluid above the normal regulated rate causes the motor to jump slightly before a constant regulated movement begins and thus may ruin a cutting tool.

In the past this difficulty has been avoided by the addition of valves incorporated in the transmission to induce a flow through the flow-regulating valve when flow to the motor was interrupted, thereby placing the compensating valve already in a position to regulate normally when flow to the motor was resumed. This necessitated additional valves, lines, and fittings in the hydraulic transmission.

It is an object of this invention to provide an improved flow-regulating valve for use in a hydraulic transmission containing a fluid pump and motor which will prevent motor jump when flow is resumed through the flow-regulating valve after interruption.

It is also an object of this invention to provide a flow-regulating valve which will prevent motor jump when flow is resumed through the flow-regulating valve after interruption by preventing a flow above the normal regulated rate before the compensating valve assumes regulating position.

It is also an object of this invention to incorporate, in combination with an adjustable throttle and compensating valve, a resiliently-loaded, pressure-responsive piston to close the compensating valve when flow through the valve ceases and which will gradually permit the compensating valve to assume normal regulating position in response to pressure increases when flow resumes.

It is a further object of this invention to provide an improved flow-regulating valve which will prevent motor jump when flow is resumed to the flow-regulating valve after interruption and which may be economically manufactured, simple in operation, and which avoids the addition to the hydraulic transmission of extra valves, lines or fittings.

Further objects and advantages of the present invention will be apparent from the following description, reference being had to the accompanying drawing wherein a preferred form of the present invention is clearly shown.

Figure 1:
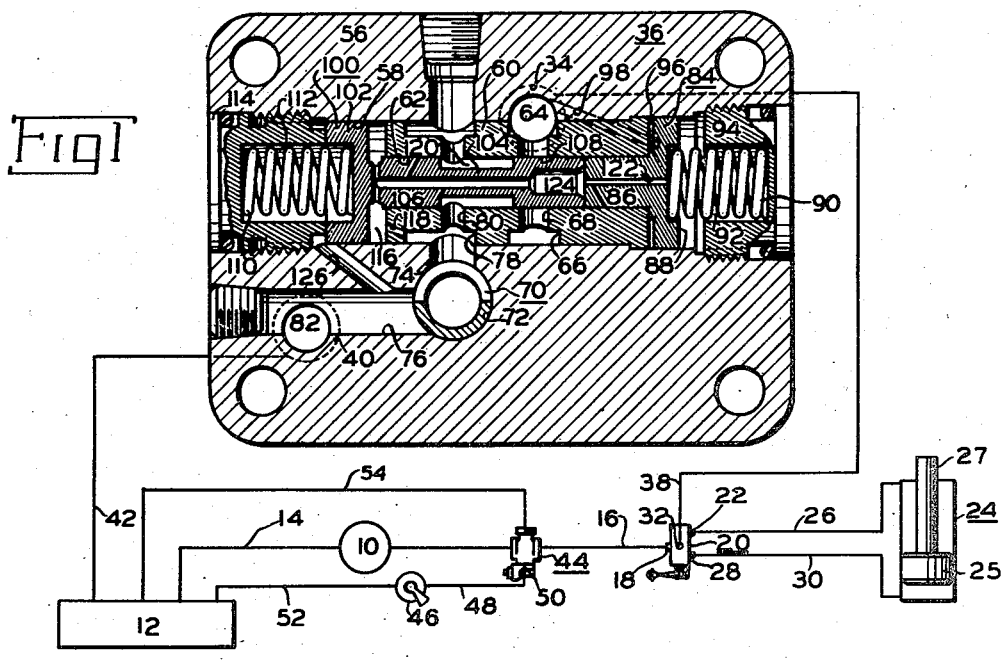
Figure 1 is a diagrammatic view of a hydraulic power transmission system incorporating a preferred form of the present invention.

Referring now to Figure 1, there is shown a pump 10 which may be driven by an electric motor, not shown, which is supplied with fluid from a tank 12 by means of a conduit 14 and which has a pump delivery conduit 16 connected to a pressure port 18 of a suitable four-way directional valve 20. A cylinder port 22 of valve 20 is connected to the rod end of a motor 24, containing a piston 25 connected to which is a rod 27, by means of a conduit 26, and another cylinder port 28 of valve 20 is connected to the head end of motor 24 by means of a conduit 30. A tank port 32 of valve 20 is connected to an inlet port 34 of a flow-regulating valve 36 by means of a conduit 38. Flow-regulating valve 36 also has an outlet port 40 which is connected to tank 12 by means of a conduit 42.

Incorporated in the pump delivery conduit 16 is a suitable relief valve 44 which is preferably constructed in accordance with the disclosure of the patent to Harry F. Vickers, No. 2,043,453. Valves of this character may be provided with a venting port for venting the control chamber in order to permit the main valve to act as an unloading valve and bypass the pump delivery at negligible pressure.

A suitable manually-controlled, two-way control valve 46 is connected by means of a conduit 48 to a venting port 50 of valve 44 and to tank 12 by means of a conduit 52. In one position, valve 44 will close venting port 50 and direct fluid from pump 10 to valve 20 which directs it to motor 24 to start said motor, while, in another position, valve 46 will open venting port 50 to tank 12 by means of conduits 48 and 52, permitting valve 44 to open completely and unload pump 10 to tank 12 by means of an exhaust conduit 54 which connects valve 44 to tank 12, thus stopping the motor 24. Relief valve 44 also serves as a safety factor in limiting the maximum pressure attainable in the system and co-operates with flow-regulating valve 36 in exhausting to tank 12 an amount of fluid from pump 10 in excess of which flow-regulating valve 36 is originally adjusted to pass.

Flow-regulating valve 36 is comprised of a body 56 having a main longitudinal bore 58 in which is tightly inserted a sleeve 60. Sleeve 60 has a longitudinal stepped bore 62 which is in communication with inlet port 34 by means of an inlet passage 64 in body 56 and a groove 66 and a passage 68 in sleeve 60.

An adjustable throttle 70 is rotatably mounted in a bore 72 which communicates with a passage 74 and a passage 76 at their point of intersection. Throttle 70 acts as an adjustable orifice in restricting the flow of fluid from passage 74 to passage 76. Passage 74 is in communication with bore 62 by means of a groove 78 and a passage 80 in sleeve 60. Passage 76 is in communication with outlet port 40 by means of an outlet passage 82.

A piston 84, comprised of a stem 86 connected to which is a hollow head 88, is inserted in bores 58 and 62 with stem 86 located in bore 62 and head 88 located in bore 58. A spring 90 of predetermined tension is located in a spring chamber 92 formed in bore 58 between piston head 88 and a hollow end cap 94 threaded into the right end of bore 58. Spring 90 positions piston 84 so that a chamber 96 is formed in bore 58 between the base of head 88 and sleeve 60. A passage 98 forms a communication between inlet passage 64 and chamber 96 so that fluid pressure in chamber 96 may act on the left side of head 88 against the resistance offered by spring 90.

Inserted in the opposite ends of bores 58 and 62 is a compensating valve 100 which is comprised of a hollow piston 102 to which is connected a stem 104 having lands 106 and 108. Stem 104 is shiftable in bore 62, and piston 102 is shiftable in bore 58. A spring 110 of predetermined tension, located in a chamber 112 formed in bore 58 between piston 102 and a hollow end cap 114 threaded into the left end of bore 58, positions compensating valve 100 in bores 58 and 62 so that land 108 abuts stem 86. A chamber 116 is formed in bore 58 between sleeve 60 and piston 102 which is in communication with groove 78 by means of a small drilled passageway 118 in sleeve 60. When so positioned, land 108 blocks communication between passage 68 and an inlet chamber 120 formed in bore 62 between lands 106 and 108.

Chamber 92 is in communication with chamber 116 by means of a centrally drilled restricted passageway 122 in piston 84 and a longitudinally stepped bore 124 in the stem 104 of compensating valve 100. A branch passageway 126 of passage 76 is in communication with chamber 112. The inlet and outlet ports 34 and 40 are preferably located at the back of the body 56 and arranged for connection to the circuit lines by suitable "panel mounting" connections such, for example, as are described in the Martin Patent No. 2,204,507.

In operation, with the electric motor running and operating pump 10 and with pump 10 unloaded by reason of valve 44 being vented to tank 12 by valve 46, so as to stop motor 24 in the position shown in Figure 1, if valve 46 is shifted to close the venting port 50 of valve 44 and if valve 20 is shifted to connect conduit 16 to conduit 30 and conduit 26 to conduit 38, pressure fluid from pump 10 will be directed to the head end of motor 24. Fluid being forced out of the rod end of motor 24 enters conduit 26 and is directed to the inlet port 34 of valve 36 by means of directional valve 20 and conduit 38. Fluid entering the inlet port 34 is conducted by means of inlet passage 64 and passage 98 to chamber 96 where it acts upon piston head 88 against the resistance offered by spring 90. Fluid entering inlet passage 64 is prevented from entering inlet chamber 120 by means of land 108. This causes a pressure increase in inlet passage 64 which is transmitted through passage 98 to chamber 96.

When a sufficient pressure increase has taken place in chamber 96, which is almost instantaneous, piston 84 shifts slowly to the right because of the dashpot action provided by the necessity of fluid in chamber 92 having to be forced through restricted passageway 122 where it may flow to tank 12 by means of bore 124 in compensating valve 100, chamber 116, passageway 118, groove 78, passage 74, throttle 70, passage 76, outlet passage 82, outlet port 40 and conduit 42. Due to this dashpot action, piston 84 will shift slowly, and, as it shifts to the right, spring 110 will shift compensating valve 100 to the right.

Figure 2:
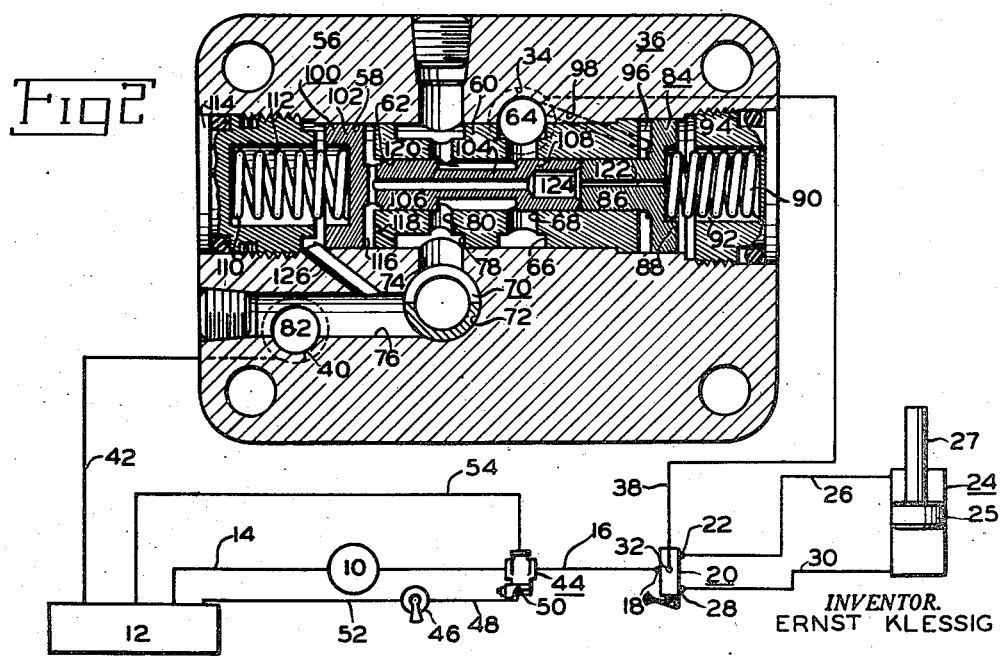
Figure 2 is a view corresponding to that of Figure 1 but showing the parts in another position during operation.

As shown in Figure 2, as land 108 breaks over passage 68, fluid may now enter inlet chamber 120, passage 80, groove 78, passage 74 and across throttle 70 from whence it flows to tank 12 by means of passage 76, outlet passage 82, outlet port 40 and passage 42. Pressure fluid entering inlet chamber 120 also enters chamber 116 by means of passage 80, groove 78 and drilled passage 118 in sleeve 60 where it may act on the right side of piston 102 against the resistance offered by spring 110. Whatever pressure is existent in passage 76 is also existent in chamber 112 by means of branch passageway 126 where it may act on the left side of piston 102 for causing the compensating valve 100 to be truly responsive to the pressure drop across throttle 70.

The purpose of compensating valve 100, which is well known in the prior art, is to maintain a constant flow across throttle 70, and it accomplishes this by maintaining a constant pressure drop across throttle 70, and, when the pressure drop across throttle 70 slightly exceeds the resistance offered by spring 110, compensating valve 100 will shift to the left to partially close passage 68 to inlet chamber 120 so as to allow just enough fluid inflow to maintain constant the pressure in chamber 120. Consequently, as piston 84 shifts to the right due to a pressure increase in chamber 96, compensating valve 100 will shift to the right by reason of spring 110 and will gradually open up inlet chamber 108 to inlet flow from passage 68.

If it were not for piston 84, when motor 24 was started after interruption, it would jump or move a short distance faster than flow-regulating valve 36 has been originally adjusted to permit piston 25 of motor 24 to move. It can be clearly seen that, if motor 24 is stopped during directional movement, flow through flow-regulating valve 36 ceases. When flow through valve 36 ceases, spring 110 would shift compensating valve 100 to the fully open position if it were not for piston 84. Thus, when motor 24 was restarted, an amount of fluid, in excess of which valve 36 has been originally adjusted to pass, would flow through the fully open compensating valve 100 before it could shift to a normal regulating position, and this would cause motor 24 to jump.

It should be noted that compensating valve 100, when in a normal regulating position, is never wholly open or fully closed. It can also be clearly seen that, if at any time motor 24 is stopped and flow through valve 36 ceases, spring 90 will shift piston 84 to the left back to the position shown in Figure 1 so as to close compensating valve 100. Consequently, when motor 24 is restarted and flow to the flow-regulating valve 36 resumes, valve 100 is closed. As the pressure increases to shift piston 84, compensating valve 100 will gradually open and is in a regulating position to maintain constant the pressure in inlet chamber 120. By preventing a flow of fluid above the normal regulated rate which flow-regulating valve 36 is adjusted to pass, piston 84 will prevent motor jump.

If, upon completion of movement of piston 25, valve 44 is vented to tank 12 to unload pump 10 and then motor 24 is restarted in the opposite direction, fluid under pressure from pump 10 will be directed to the rod end of motor 24. When motor 24 was stopped and fluid to valve 36 ceased, piston 84 closed compensating valve 100. Consequently, the very same operation is again performed by piston 84. Compensating valve 100 will gradually open as piston 84 shifts to the right to assume a normal regulating position and regulate the flow of fluid across throttle 70.

While the form of embodiment of the invention as herein disclosed constitutes a preferred form, it is to be understood that other forms might be adopted, all coming within the scope of the claims which follow.

What is claimed is as follows:

1. A flow regulating valve for controlling the flow of fluid in hydraulic power transmission systems comprising in combination means forming a flow passage, in series in the passage an adjustable throttle through which fluid is adapted to flow at a regulated rate and a pressure compensating valve, operating means for the compensating valve responsive to the pressure drop across the throttle for causing the compensating valve to assume various regulating positions to maintain the regulated flow rate through the throttle, means for effecting a closing of the passage when fluid flow to the passage is interrupted, and operating means for the closing means responsive to predetermined increases of pressure in the passage ahead of the compensating valve when fluid flow is resumed to the passage after interruption for effecting a gradual opening of the passage.

2. A flow regulating valve for controlling the flow of fluid in hydraulic power transmission systems comprising in combination means forming a flow passage having an inlet and an outlet, in series in the passage an adjustable throttle through which fluid is adapted to flow at a regulated rate and a pressure compensating valve, operating means for the compensating valve responsive to the pressure drop across the throttle for causing the compensating valve to assume various regulating positions to maintain the regulated flow rate through the throttle, means for effecting a closing of the passage when fluid flow to the inlet of the passage is interrupted, and operating means for the closing means responsive to predetermined increases of pressure at the inlet of the passage when fluid flow is resumed to the passage after interruption for effecting a gradual opening of the passage.

3. A flow regulating valve for controlling the flow of fluid in hydraulic power transmission systems comprising in combination means forming a flow passage, in series in the passage an adjustable throttle through which fluid is adapted to flow at a regulated rate and a pressure compensating valve, operating means for the compensating valve responsive to the pressure drop across the throttle for causing the compensating valve to assume various regulating positions to maintain the regulated flow rate through the throttle, and resiliently loaded means shifting the compensating valve to a position closing the passage when fluid flow to the passage is interrupted, said resiliently loaded means being responsive to predetermined increases of pressure in the passage when fluid flow to the passage is resumed after interruption for permitting the compensating valve to gradually assume a regulating position from the fully closed position.

4. A flow regulating valve for controlling the flow of fluid in hydraulic power transmission systems comprising in combination means forming a flow passage, in series in the passage an adjustable throttle through which fluid is adapted to flow at a regulated rate and a pressure compensating valve, operating means for the compensating valve responsive to the pressure drop across the throttle for causing the compensating valve to assume various regulating positions to maintain the regulated flow rate through the throttle, and including biasing means tending to shift the compensating valve to the fully open position when fluid flow to the passage is interrupted, and means for overcoming the biasing means and shifting the compensating valve to a position closing the passage when fluid flow to the passage is interrupted, said means being responsive to predetermined increases of pressure in the passage ahead of the compensating valve when fluid flow to the passage is resumed after interruption for permitting the compensating valve to be operated to a regulating position from the fully closed position.

5. A flow regulating valve for controlling the flow of fluid in hydraulic power transmission systems comprising in combination means forming a flow passage, in series in the passage an adjustable throttle through which fluid is adapted to flow at a regulated rate and a pressure compensating valve, operating means for the compensating valve responsive to the pressure drop across the throttle for causing the compensating valve to assume various regulating positions to maintain the regulated flow rate through the throttle, and resiliently loaded means associated with the compensating valve to close the passage when fluid flow to the passage is interrupted, said resiliently loaded means being responsive to predetermined increases of pressure in the passage when fluid flow is resumed to the passage after interuption and coacting with the compensating valve to gradually reopen the passage.

6. A flow regulating valve for controlling the flow of fluid in hydraulic power transmission systems comprising in combination means forming a flow passage having an inlet and an outlet, in series in the passage an adjustable throttle through which fluid is adapted to flow at a regulated rate and a pressure compensating valve, operating means for the compensating valve responsive to the pressure drop across the throttle for causing the compensating valve to assume various regulating positions to maintain the regulated flow rate through the throttle, and including biasing means tending to shift the compensating valve to a position fully opening the passage when flow to the passage is interrupted, and resiliently loaded means shifting the compensating valve to a position closing the passage when fluid flow to the inlet of the passage is interrupted, said resiliently loaded means being responsive to predetermined increases of pressure at the inlet of the passage when fluid flow to the passage is resumed after interruption for permitting the compensating valve to gradually assume a regulating position from the fully closed position.

7. In a hydraulic power transmission system having a fluid pump, a fluid motor, and control means for selectively operating the motor and interrupting fluid flow to the motor for stopping the same, a flow regulating valve for controlling the speed of the motor comprising in combination means forming a flow passage connected to the motor, in series in the passage an adjustable throttle and a pressure compensating valve, operating means for the compensating valve responsive to the pressure drop across the throttle for causing the compensating valve to assume various regulating positions to maintain the pressure drop across the throttle constant and including biasing means tending to shift the compensating valve to a position fully opening the passage when fluid flow to the passage is interrupted, and resiliently loaded means shifting the compensating valve to a position closing the passage when the motor is stopped and fluid flow to the passage is interrupted, said resiliently loaded means being responsive to increases of pressure in the passage when the control means is operated to resume operation of the motor and fluid flow to the passage for permitting the compensating valve to assume a regulating position from the fully closed position.

8. In a hydraulic power transmission system having a fluid pump, a fluid motor, and control means for selectively operating the motor and interrupting fluid flow to the motor for stopping the same, a flow regulating valve for controlling the speed of the motor comprising in combination means forming a flow passage connected to the motor, in series in the passage an adjustable throttle and a pressure compensating valve, and opposing resiliently loaded means for operating the compensating valve, one of which is responsive to the pressure drop across the throttle for causing the compensating valve to assume various regulating positions to maintain the pressure drop across the throttle constant and the second of which biases the compensating valve to a position closing the passage when the motor is stopped and flow to the passage is interrupted, said second resiliently loaded means being responsive to increases of pressure at the inlet of the passage when the control means is operated to resume operation of the motor and fluid flow to the inlet of the passage for causing the compensating valve to be gradually operated to a regulating position from the fully closed position.

ERNST KLESSIG.

REFERENCES CITED

The following references are of record in the file of this patent:

UNITED STATES PATENTS

| Number | Name | Date |
|---|---|---|
| 2,166,940 | Conradson | July 25, 1939 |
| 2,313,056 | Emerson et al. | Mar. 9, 1943 |

FOREIGN PATENTS

| Number | Country | Date |
|---|---|---|
| 373,732 | Great Britain | June 2, 1932 |